United States Patent [19]

Bowers et al.

[11] Patent Number: 4,816,535

[45] Date of Patent: * Mar. 28, 1989

[54] ALLYLOXY ACTIVATED SURFACE COATINGS

[75] Inventors: Gary R. Bowers, Westfield; Christopher J. Hardiman, Belchertown, both of Mass.

[73] Assignee: Monsanto Company, St. Louis, Mo.

[*] Notice: The portion of the term of this patent subsequent to Oct. 18, 2005 has been disclaimed.

[21] Appl. No.: 946,742

[22] Filed: Dec. 24, 1986

[51] Int. Cl.$^4$ .................................................. C08F 4/44
[52] U.S. Cl. ...................................... 526/143; 526/173; 526/194; 526/214; 526/332
[58] Field of Search ............... 526/214, 332, 173, 143, 526/194

[56] References Cited

U.S. PATENT DOCUMENTS

| | | | |
|---|---|---|---|
| 2,861,060 | 11/1958 | Goode | 526/214 |
| 3,590,025 | 6/1971 | Tittle | 526/214 |
| 4,145,248 | 3/1979 | Van Eenam | 549/512 |
| 4,228,232 | 10/1980 | Rousseau | 528/76 |
| 4,520,184 | 4/1985 | Van Eenam | 526/320 |
| 4,590,101 | 5/1986 | Knapczyk | 525/298 |

FOREIGN PATENT DOCUMENTS 435901  3/1964  Japan .................... 526/214

OTHER PUBLICATIONS

CA 90:1690796, Belogorodskaya et al., 1979, 22-Physical Org. Chem. 106: 17697 n, 1987.
Chemical Abstract: CA81(5):25111X, Ohashi et al. "Stabilization of Alpha-Cyanoacrylates." Kokai 49/31619.
Chemical Abstract: CA93(26):240735g, Toa Gosei Chemical Industry Co., Ltd. "Stabilizers for Cyanoacrylate Ester Adhesives." Kokai 55/99980.
Chemical Abstract: CA90(22):169079b, "Copolymerization of Cyclopentadiene with Indene in the Presence of the Trifluoroacetic Acid-Cobalt Acetate Catalytic System" (copy enclosed-not translated).
Chemical Abstract: CA106(2):17697n, Taqui-Khan, et al. "Kinetics and Mechanism of Ruthenium (III)-Catalyzed Oxidation of Allyl Alcohol by Molecular Oxygen." (copy enclosed).

Primary Examiner—Joseph L. Schofer
Assistant Examiner—N. Sarofim
Attorney, Agent, or Firm—William J. Farrington; Thomas E. Kelley

[57] ABSTRACT

Allyolxy activated surface coatings of free radical-polymerizable compounds having fugitive acid stabilized metal drier and peroxide free radical initiator form durable films over urethane substrates.

5 Claims, No Drawings

ALLYLOXY ACTIVATED SURFACE COATINGS

This invention relates to allyloxy activated surface coatings of free radical-polymerizable compounds, especially to such coatings cured with metal drier catalysts that are stabilized by strong fugitive acid.

Surface coatings of free radical-polymerizable compounds are preferably cured with an activator or crosslinker to provide a durable coating as well as with metal drier catalyst, e.g. a cobalt compound, and free-radical intiator, e.g. a peroxide. A disadvantage of such coatings is that compositions comprising cobalt compounds as metal drier catalyst and peroxide as free radical initiator typically have an undesirably short pot life, e.g. often less than about an hour or so. Extended pot life, e.g. at least about eight hours or more, has been provided with coating compositions comprising a temporary catalyst inhibitor, for instance acetoxime. Such acetoxime-stabilized coating compositions are suitable for some applications, however, they often fail to cure, e.g. when applied to urethane substrates.

SUMMARY OF THE INVENTION

It has been discovered that such coating compositions will cure over urethane substrates when the acetoxime stabilizer is replaced with a strong fugitive acid, such as trifluoroacetic acid. Accordingly, an invention disclosed herein relates to coating compositions comprising: (a) free radical polymerizable compounds, allyloxy compounds, metal drier catalyst, peroxide free radical initiator and a strong, fugitive acid as a catalyst stabilizer. Also disclosed are methods of coating urethane substrates with cured films of such coating compositions.

DETAILED DESCRIPTION OF THE INVENTION

The coating compositions and methods of the invention comprise metal drier than is effective in catalyzing free-radical polymerization of unsaturated compounds where the catalytic effect of the metal compound is reversibly inhibited by a strong, fugitive acid, such as trifluoroacetic acid or other acid having substantially similar properties of strength, volatility and miscibility with coating system components. The metal compound can include any of the metal driers which are well known in the coating industry. Preferred metal compounds include cobalt or manganese compounds, e.g. fatty acid salts of such metals. In preferred embodiments the cobalt compound can comprise any of variety of compounds such as cobaltous acetate, citrate, acetylacetonate, 2-ethyl hexanoate and the like.

In characterizing the acid useful in the coating compositions and methods of this invention, the term "fugitive" describes the transcience of the acid under coating conditions. For instance, desirable acids are a generally stable component of such metal driers or coating compositions providing inhibition of the catalytic action of the metal drier during storage and application prior to curign conditions. However, when films of such coating compositions are subjected to curing conditions, e.g. elevated temperatures or reduced vapor pressure, the inhibiting effect of the acid is diminished. The transcience of such fugitive acid can be due to evaporation, e.g. for acids having low boiling points, or from decomposition, e.g. for acids of low stability at elevated temperatures, or from other phenomena tending to neutralize the inhibiting effect of the acid on the metal drier catalyst.

In many cases preferred acids are carboxylic acids having boiling points lower than cure temperatures of the coating systems, e.g. acids having boiling points less than about 300° C., say about 150° C., in many cases more preferably less than about 120° C. In this regard such a preferred acid is trifluoroacetic acid, having a boiling point of about 72° C.

In other cases preferred acids will tend to decompose into volatile components at temperatures lower than the cure temperature. Such decomposing acids can comprise carboxylic acid such as glycolic acid or mineral acid such as hydrochloric acid.

The amount of acid is preferably the greater of an amount sufficient to materially retard the catalytic effect of the metal compound at least at storage conditions of coating compositions. In general higher levels of acid (e.g. up to about 20, or even 50 times the amount of metal on a weight basis) can be tolerated and may be desired to assure sufficient catalytic retardation. In some cases it is useful to provide the acid at least about the equivalent amount of metal compound.

Metal compounds are often provided in coating compositions at catalytic levels of from about 0.001 to about 1.0% by weight; the acid can be provided at levels from about 0.01 to about 10% by weight.

Acid-stabilized metal drier can be provided as a solution or suspension of metal compound in the acid, e.g. trifluoroacetic acid, alone or with other commonly used solvents including water, ketones such as methyl isobutyl ketone, methyl ethyl ketone, acetone and the like and mixtures thereof.

The effect of the strong acid is generally advantageously promoted by the presence of at least a minor amount of water to promote hydration of the acidic proton. Since water is often present in minor but sufficient amounts in components used in the driers and coating compositions of this invention the deliberate addition of specific quantities of water is often not required.

The compositions and methods also utilize a free radical initiator. Such free radical initiator can comprise peroxides such as t-butyl hydroperoxide, cumene peroxide, methyl ethyl ketone provide, lauroyl peroxide, benzoyl peroxide, azo-bis(isobutyronitrile) and the like and mixtures thereof.

The free radical-polymerizable compound useful in the compositions and methods of this invention can be an unsaturated monomer or oligomer or mixture of monomers and oligomers. The nature of the compound is not critical so long as it is activated towards free radical polymerization via the double bonds when it is brought into reactive admixture with a metal drier and/or free-radical initiator. Such compounds include drying oils such as castor, linseed, oticica, safflower, soybean, sunflower, tung and certain fish oils; acrylic monomers; vinyl monomers such as styrenic monomers, vinyl ethers, vinyl esters, vinyl imides, vinyl amides; maleates and fumarates. In many cases it is preferred that such compounds be selected from acrylyl monomers or oligomers; such preferred compounds desirably having a number average molecular weight less than about 4000 and contain from 1 to about 10 unsaturated groups per molecule. A particularly preferred group of acrylyl monomers is represented by the structure:

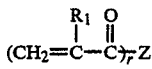

where $R_1$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate of a number average molecular weight less than about 4000 containing a hydrocarbon, ester, amide, ether of urethane backbone. Such monomers may be obtained by reaction of acryloyl, methacryloyl or ethacryloyl chloride with an alcohol, a polyol, an amine, or a polyamine or by the reaction of acrylic acid, methacrylic acid or ethacrylic acid with an epoxide, a polyepoxide, an isocyanate, or a polyisocyanate, or by reaction of a hydroxyalkyl acrylate, methacrylate or ethacrylate with a carboxylic acid, polycarboxylic acid, an epoxide, a polyepoxide, an isocyanate, or a polyisocyanate. Such monomers include methyl acrylate, methyl methacrylate, butyl acrylate, 1,3-butylene glycol diacrylate, 1,6-hexanediol diacrylate, the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 400, and the polyacryloyl monomers prepared by reacting isocyanate capped polyethers and isocyanate capped polyesters of molecular weight up to 4000 with hydroxyethyl acrylate.

The coating compositions and methods of this invention also comprise an allyloxy compound which may tend to activate the cure process. Certain allyloxy compounds can advantageously serve as crosslinking agents to provide desirable cured film properties. Suitable allyloxy compounds are selected from $\beta,\gamma$-unsaturated ethers having at least one $\alpha$-hydrogen atom in which the allyloxy group may be represented by the following formula:

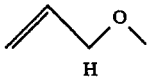

The $\beta,\gamma$-unsaturated ether compound has an equivalency less than about 300, based upon the number of $\beta,\gamma$-unsaturated ether groups having an $\alpha$-hydrogen, a molecular weight less than about 10,000, and has from 1 to 60 $\beta,\gamma$-unsaturated ether groups.

The allyloxy compounds are generally aliphatic in character. Alternatively, compounds having $\beta,\gamma$-unsaturation with a triple bond as in propargyl methyl ether, dipropargyl ether, tripropargyl trimethylol propane, or hexapropargyl sorbitol may be used and are considered equivalent to allyloxy compounds for purposes of this invention. Exemplary of allyloxy compounds useful in the compositions of this invention are the following: methyl allyl ether, methyl methallyl ether, butyl allyl ether, diallyl ether, allyl methallyl ether, dicrotyl ether di-(2-chloro-2-propenyl) ether, di-(2-phenyl-2-propenyl) ether, di(1-methyl-2-propenyl) ether, 1-phenyl-2-propenyl ether, di-(3-phenyl-2-propenyl) ether, di-(2-isopropyl-2-propenyl) ether, 1,4-diallyl oxy-2-butene, 1,4-diallyloxy-2-butyne, 1,6-diallyl oxyhexane, 1,4-dimethallyloxypentane, 2,5-dimethoxy-2,5-dihydrofuran, allyl glycidyl ether; allyloxy compounds prepared from the ionic polymerization of allyloxyalkyl acrylates, methacrylates, acrylamides or the allyloxy derivatives of vinyl ethers, such as poly(allyloxyethylmethacrylate) and poly(allyl vinyl ether); allyloxy compounds wherein the allyloxy group forms part of an oligomeric backbone, such as poly(2-buten-1,4-diol) or 2,5-poly(2,5-dihydrofuran).

Preferred allyloxy compounds may be selected from the group of polyethers and polyesters represented by the structural formulae:

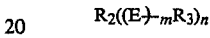

where $R_2$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

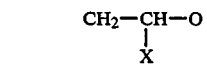

and

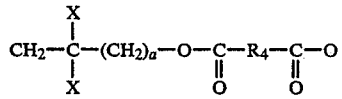

where the X groups are independently selected from the group consisting of H, $CH_3$, $C_2H_5$ and $CH_2OCH_2Y$, Y being selected from the group consisting of $CH=CH_2$, $H_3C-C=CH_2$, and $H_5C_2-C=CH_2$, where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60. It is anticipated that any of the hydrogens in Y, except at least one alpha to the ether group, can be replaced with a lower alkyl without substantially affecting the invention and that the resulting compounds would be equivalent to those according to the invention. Polyethers containing an allyloxy group may be prepared by ionic polymerization of allyl glycidyl ether or mixtures of allyl glycidyl ether and the appropriate alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the monoallyl ether of trimethylolethane, the monoallylether of trimethylolpropane, the monoallyl ether of pentaerythritol, the diallyl ether of pentaerythritol and similar mono and polyallyl ethers of polyols. Allyl glycidyl ether or methallyl glycidyl ether may also be substituted for the monoallyl ether of glycerol.

Another group of preferred allyloxy compounds is represented by the structural formula:

$$R_5(OCH_2Y)_p$$

where $R_5$ is a $C_2$ to $C_{12}$ aliphatic hydrocarbyl or oxahydrocarbyl radical of equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-β-methyl glucoside, and decaallyl sucrose.

Yet another group of preferred allyloxy compounds are acetals derived from allyl alcohol or methallyl alcohol and aldehydes and those derived from a polyol and an acrolein compound represented by the structural formulas:

$$R_6(CH(OCH_2Y)_2)_q \text{ and } R_7(O_2CHY)_r$$

where $R_6$ is absent or is a $C_1$ to $C_{20}$ unsubstituted or a substituted hydrocarbyl group, Y is a group as defined hereinabove and q is in the range of 2 to about 30; and where $R_7$ is a radical of molecular weight less than about 10,000 obtained by removal of at least two active hydrogens from a polyol and r is in the range of about 1 to about 170. Such compounds include 1,1,2,2-tetrakis(allyloxy)ethane, 1,1,6,6-tetrakis(allyloxy)hexane and those derived from acrolein, methacrolein or crotonaldehyde and a polyol and those derived from polyacrolein and acrolein copolymers. Exemplary are triallylidine sorbitol and the polyacrolein acetal of polyvinyl alcohol.

The more preferred allyloxy activator compounds are the polyether and polyacetal compounds in which the number of allyloxy groups per average molecule is in the range of 2 to 40 and the allyloxy equivalent is less than about 250. Most preferably the allyloxy equivalent is less than about 150.

Depending on the end use and the application requirements it may be convenient to add any of the other conventional additives for surface coating compositions such as solvents, pigments, fillers, reinforcing agents, stabilizers, inhibitors and flow control agents. The proportions of the ingredients can vary widely depending on the compatibility of the major ingredients and the nature of the coating to be obtained. The major ingredients are advantageously selected to be compatible with one another to provide a sufficiently rapid cure of the coating and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible, a weight range of allyloxy compound to free-radical-polymerizable compound (e.g. in the range of from 70:30 to 1:99) can be used. Preferably this ratio will be in the range from 40:60 to 5:95 to provide an adequate rate of cure and an adequate level of mechanical properties in the cured coating.

In those cases where it may be desirable to provide solvent (or vehicle) for the coating composition of this invention, such solvent is preferably a volatile organic compound comprising a ketone, such as acetone, methyl ethyl ketone, methyl isobutyl ketone, etc.; an ester such as ethylene glycol monoethyl ether acetate; an aromatic such as toluene, xylene; or a mixture thereof.

The coating compositions of this invention are advantageously applied as thin films to substrates, most advantageously to urethane substrates, e.g. reaction injection molded (RIM) urethane substrates. Such films are generally cured by heating the film, e.g. in an air oven or by IR lamps, to accelerate cure to a tough, solvent-resistant coating. Exposing the film to a temperature of at least 50° C. or higher, preferably to at least 70° C., say about 80° C. provides quite acceptable cured films. Higher temperatures can of course be utilized especially to effect curing in shorter times.

The following disclosure is provided to illustrate specific embodiments and aspects of this invention but does not imply any limitation of the scope of the invention.

MATERIALS USED

In the following described materials, the symbol "(n)" indicates a solution in the identified solvent where "n" is the weight percent of the described material in solution.

UV1(n): acrylated urethane oligomer obtained from Morton-Thiokol Company as Uvithane-893, unsaturation 0.15–0.175 equivalents/100 g; diluted with MEK to provide a solution of weight percent indicated in parenthesis, e.g. UVI(75) is 75 wt.%.

AOC: allyloxy compound, a reaction product of ethylene glycol and allyl glycidyl ether (1:10 mole ratio) in the presence of boron trifluoride/etherate catalyst at 75°–80° C. The allyl glycidyl ether is added over a period of 5 hours. The catalyst is neutralized with NaOH solution. The aqueous phase is separated from an organic phase product which is dried and filtered. The liquid organic product has a Gardner viscosity of F at 25° C. and an allyloxy equivalent of about 120.

MEK: methyl ethyl ketone

BPO: benzoyl peroxide, 10% solution in MEK.

Co(n): a cobalt catalyst compound obtained from Nuodex, Inc. as Nuocure ® 10% cobalt catalyst in mineral spirits; solution diluted with MEK to weight percent indicated in parenthesis, e.g. Co(0.1) is 0.1 wt.% cobalt.

TFA(n): trifluoroacetic acid in MEK solution where weight percent acid is indicated in parenthesis, e.g. TFA(1) is 1 wt.%.

BYK: a mar and slip additive obtained from Mallinkrodt, Inc. as BYK-341.

ETOH(n): ethanol in water solution where weight percent ethanol is indicated in parenthesis.

EXAMPLE

This example serves to illustrate the effectiveness of substituting trifluoroacetic acid for acetoxime as a stabilizer for metal drier in coating compositions comprising acrylated resins and allyloxy initiator.

Compositions, prepared from components indicated in Table 1, were applied as thin (about 10 micron thick) films over RIM urethane substrates. Composition A stabilized with acetoxime had a suitably extended pot life; but thin films applied to a RIM urethane substrate did not cure when heated to about 82° C. for 30 minutes. Composition B stabilized with trifluoroacetic acid had a suitably extened pot life (typically at least about 2 days); and thin films cured to a tack free (to the touch) films when heated to about 82° C. for 30 minutes. Composition B, without peroxide, had exceptionally long pot life (e.g. days); but thin films did not cure.

TABLE 1

COATING COMPOSITIONS
(parts by weight)

| | Component: | | |
|---|---|---|---|
| | A | B | C |
| UVI (75) | 5.3 | 5.3 | 5.3 |
| AOC | 1 | 1 | 1 |
| BPO (10) | 1.5 | 1.5 | — |
| TFA (10) | — | 0.12 | 0.12 |
| OXI (1) | 0.3 | — | — |
| MEK | 0.19 | 0.58 | 0.34 |
| Co (.1) | 0.5 | 0.5 | 0.5 |
| BYK | 0.06 | — | — |
| ETOH (80) | — | — | 0.8 |

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A coating composition comprising
   (a) a free radical-polymerizable compound,
   (b) an allyloxy compound,
   (c) a cobalt drier catalyst,
   (d) a peroxide free radical initiator, and
   (e) a strong fugitive acid as a catalyst stabilizer;
wherein said free-radical polymerizable compound is of the formula $$(CH_2=\overset{R_1}{\underset{|}{C}}-\overset{O}{\underset{\|}{C}})_r Z$$

where $R_1$ is selected from the group consisting of H, $CH_3$ and $C_2H_5$, where r is an integer in the range of 2 to 10 and Z is a saturated or ethylenically unsaturated residue of a polyol, a polycarboxylic acid, a polyamine, a polyepoxide or a polyisocyanate of a number average molecular weight less than about 2000 containing a hydrocarbon, polyester, polyamide, polyether or polyurethane backbone.

2. A composition according to claim 1 wherein said acid comprises trifluoroacetic acid.

3. A composition according to claim 1 wherein said allyloxy compound is $$R_2((E)_mR_3)_n, R_5(OCH_2Y)_p, R_6(CH(OCH_2Y)_2)_q \text{ or } R_7(O_2CHY)_r$$

where $R_2$ is a radical of molecular weight less than about 10000 obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae $$CH_2-CH-O \text{ and } CH_2-\overset{X}{\underset{|}{C}}-(CH_2)_a-O-\overset{\|}{\underset{O}{C}}-R_4-\overset{\|}{\underset{O}{C}}-O$$
$$\overset{|}{X} \qquad \overset{|}{X}$$

where X is selected from the group consisting of H, $CH_3$, $C_2H_5$ and $CH_2OCH_2Y$, Y being selected from the group consisting of $$CH=CH_2, CH_3-C=CH_2, \text{ and } C_2H_5-C=CH_2$$

where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60: where $R_5$ is a $C_2$ to $C_{12}$ aliphatic hydrocarbyl or oxahydrocarbyl radical of equivalence p in the range of 2 to 12; where $R_6$ is absent or is a $C_1$ to $C_{20}$ saturated or ethylenically unsaturated residue of a polyol, a polycarboxylic acid, a polyamine, a polyepoxide or a polyisocyanate of a number average molecular weight less than about 2000 containing a hydrocarbon, polyester, polyamide, polyether or polyurethane backbone.

4. The coating composition of claim 1 wherein said film is cured on a urethane substrate.

5. The coating composition of claim 1 wherein said film is cured on a urethane substrate.

* * * * *

UNITED STATES PATENT AND TRADEMARK OFFICE
CERTIFICATE OF CORRECTION

PATENT NO. : 4,816,535

DATED : March 28, 1989

INVENTOR(S) : Gary R. Bowers et al.

It is certified that error appears in the above-identified patent and that said Letters Patent is hereby corrected as shown below:

At Col 8, delete lines 37-42 and insert therefore:

$R_6$ is absent or is a $C_1$ to $C_{20}$ unsubstituted or substituted hydrocarbyl group and q is in the range of 2 to about 30; $R_7$ is a radical of molecular weight less than about 10,000 obtained by removal of at least two active hydrogens from a polyol and r is in the range of about 1 to about 170; and wherein the weight ratio of α,β-ethylenically unsaturated compound to allyloxy compound is in the range of about 30:70 to about 99:1; and wherein the allyloxy compound contains from 4 to 60 allyloxy groups per molecule.

Signed and Sealed this

Thirteenth Day of March, 1990

Attest:

JEFFREY M. SAMUELS

Attesting Officer

Acting Commissioner of Patents and Trademarks